(12) United States Patent
Liu (10) Patent No.: US 11,686,950 B2
(45) Date of Patent: Jun. 27, 2023

(54) ATMOSPHERE STARRY SKY LIGHT FOR FESTIVAL ENTERTAINMENT

(71) Applicant: ZHONGSHAN BOLANG ELECTRONIC TECHNOLOGY CO., LTD., Zhongshan (CN)

(72) Inventor: Ke Xian Liu, Zhongshan (CN)

(73) Assignee: ZHONGSHAN BOLANG ELECTRONIC TECHNOLOGY CO., LTD., Zhongshan (CN)

( * ) Notice: Subject to any disclaimer, the term of this patent is extended or adjusted under 35 U.S.C. 154(b) by 0 days.

(21) Appl. No.: 17/388,150

(22) Filed: Jul. 29, 2021

(65) Prior Publication Data
US 2022/0404633 A1 Dec. 22, 2022

(30) Foreign Application Priority Data

Jun. 18, 2021 (CN) .......................... 202121371710.7

(51) Int. Cl.
*G02B 27/42* (2006.01)
*G02B 26/08* (2006.01)
*G03B 21/20* (2006.01)

(52) U.S. Cl.
CPC ..... *G02B 27/4205* (2013.01); *G02B 26/0808* (2013.01); *G03B 21/208* (2013.01); *G03B 21/2033* (2013.01)

(58) Field of Classification Search
CPC ............ G02B 27/4205; G02B 26/0808; G03B 21/2033; G03B 21/208
See application file for complete search history.

(56) References Cited

U.S. PATENT DOCUMENTS

| | | | | |
|---|---|---|---|---|
| 5,649,827 A * | 7/1997 | Suzaki | ................... | G09B 27/02 353/30 |
| 6,821,125 B2 * | 11/2004 | Sekiguchi | ............. | G09B 27/00 434/285 |
| 7,004,588 B2 * | 2/2006 | Sadler | ................... | G09B 27/04 362/559 |
| 10,509,304 B2 * | 12/2019 | Chien | ................... | G01S 3/7864 |
| 11,378,879 B1 * | 7/2022 | Li | .............................. | F21V 5/04 |
| 2001/0010537 A1 * | 8/2001 | Lang | ...................... | G09B 27/02 348/36 |

(Continued)

FOREIGN PATENT DOCUMENTS

| CN | 201853421 U | * | 6/2011 | ............ | G09B 29/00 |
| CN | 110782773 A | * | 2/2020 | ............ | G09B 27/00 |

(Continued)

*Primary Examiner* — Magda Cruz
(74) *Attorney, Agent, or Firm* — Li & Cai Intellectual Property (USA) Office (57) ABSTRACT

An atmosphere starry sky light for festival entertainment is provided. The constellation unit is configured to switch patterns of twelve constellations and perform projection display on the patterns of the twelve constellations. The starry sky unit is configured to project a starry sky background. The background unit is configured to project patterns of aurora, clouds, and ripples. The planetary unit is configured to switch patterns of a planet, and to project and display a planetary image. The constellation unit, the planetary unit, the starry sky unit and the background unit form a panoramic image of the cosmic starry sky by superimposing and combining.

5 Claims, 9 Drawing Sheets

(56) References Cited

U.S. PATENT DOCUMENTS

| | | | | |
|---|---|---|---|---|
| 2003/0179376 A1* | 9/2003 | Houde-Walter | ....... | G02B 27/30 |
| | | | | 356/399 |
| 2007/0296923 A1* | 12/2007 | Lee | ........ | G09B 27/00 |
| | | | | 353/46 |
| 2009/0273762 A1* | 11/2009 | Ohira | ....... | G03B 37/04 |
| | | | | 353/62 |
| 2016/0209013 A1* | 7/2016 | Chien | ....... | F21V 14/02 |
| 2016/0313636 A1* | 10/2016 | Chien | ....... | F21V 21/08 |
| 2021/0164628 A1* | 6/2021 | Zheng | ....... | F21V 5/04 |
| 2021/0247039 A1* | 8/2021 | Zheng | ....... | F21V 5/04 |
| 2021/0381666 A1* | 12/2021 | Zheng | ....... | F21V 14/04 |
| 2022/0381412 A1* | 12/2022 | Ge | ....... | G03B 29/00 |

FOREIGN PATENT DOCUMENTS

| | | | | | |
|---|---|---|---|---|---|
| CN | 112503423 A | * | 3/2021 | ....... | F21S 6/00 |
| JP | 09138368 A | * | 5/1997 | ....... | G02B 27/18 |
| JP | 2014106377 A | * | 6/2014 | ....... | G09B 27/00 |
| JP | 2016186559 A | * | 10/2016 | ....... | G03B 21/14 |

* cited by examiner

ATMOSPHERE STARRY SKY LIGHT FOR FESTIVAL ENTERTAINMENT

FIELD OF THE DISCLOSURE

The present disclosure relates to an atmosphere starry sky light, in particular, to an atmosphere starry sky light for festival entertainment

BACKGROUND OF THE DISCLOSURE

Atmosphere lights can create scenes that people need through different brightness and different light colors, which mainly play a role in contrasting the atmosphere, and can be used in home decoration or car interiors. The atmosphere light in the prior art lacks the function of displaying the panoramic patterns of the universe. Even if it has, the function is relatively single, cannot switch the display, and cannot meet people's requirements.

SUMMARY OF THE DISCLOSURE

The purpose of the present disclosure is to provide an atmosphere starry sky lamp for festival entertainment, which solves the shortcomings of the prior art.

The present disclosure adopts the following technical solution to embody.

An atmosphere starry sky light for festival entertainment is provided, comprising: a constellation unit, a planetary unit, a starry sky unit and a background unit, wherein: the constellation unit is configured to switch patterns of twelve constellations and perform projection display on the patterns of the twelve constellations; the starry sky unit is configured to project a starry sky background; the background unit is configured to project patterns of aurora, clouds, and ripples; the planetary unit is configured to switch patterns of a planet, and to project and display a planetary image; and the constellation unit, the planetary unit, the starry sky unit and the background unit form a panoramic image of the cosmic starry sky by superimposing and combining.

Preferably, the constellation unit is provided with a DOE grating combination disk, the DOE grating combination disk is provided with a twelve constellation pattern, a constellation pattern DOE grating lens is arranged above the DOE grating combination disk, a laser generator is provided below the DOE grating combination disk, an optical path of the laser generator emitting laser light is divided into two paths by a beam splitter, in which one optical path passes through the DOE grating combination disk and forms the twelve constellation pattern on the constellation pattern DOE grating lens, and the other optical path is directed to a stars imaging DOE grating lens under a starry sky imaging DOE grating lens in the starry sky unit.

Preferably, a gear plate is arranged in the starry sky unit, the gear plate is connected with s reduction motor, and the stars imaging DOE grating lens is arranged between the gear plate and the starry sky imaging DOE grating lens.

Preferably, the background unit comprises a transmission disk, the transmission disk is connected with the reduction motor, a planetary LED light source is arranged above the transmission disk, and a curved optical lens and/or a serrated optical lens is arranged above the planetary LED light source.

Preferably, the planetary unit is provided with a wheel with a replaceable planetary pattern, the planetary LED light source is arranged under the wheel, and the planetary pattern is arranged above the wheel.

Preferably, the planetary LED light source is installed on a light source base.

The beneficial technical effects of the present disclosure are: through the DOE grating component that illuminates the celestial figure, the constellation pattern is imaged and projected, the light source has a large divergence angle, the constellation pattern has a high divergence, can carry out large-angle pattern projection, and the projection definition is high. The light source uses a multi-level corrugated optical lens to image and project the scene of auroral clouds. Through the projection lens to image and project the astronomical scene, the moon, the planet and other celestial bodies, multiple functional units are combined with each other to form a panoramic image of the universe and the starry sky, with a good visual experience.

DETAILED DESCRIPTION OF THE EXEMPLARY EMBODIMENTS

Through the following description of the embodiments, it will be more helpful for the public to understand the present disclosure, but the specific embodiments given by the applicant cannot and should not be regarded as a limitation on the technical solution of the present disclosure, and any component or changes in the definition of technical features and/or changes in form but not in substance to the overall structure should be regarded as the scope of protection defined by the technical solution of the present disclosure.

Reference numeral: planetary pattern 1, wheel 2, planetary pattern 3, planetary LED light source 4, light source base 5, gear plate 6, stars imaging DOE grating lens 7, stars imaging DOE grating lens 8, reduction motor 9, transmission disk 10, planetary LED light source 11, curved optical lens 12, serrated optical lens 13, laser generator 14, DOE grating combination disk 15, constellation pattern DOE grating lens 16, beam splitter 17, beam splitter 18.

The central idea of the present disclosure is to design an atmosphere starry sky light for festival entertainment. The atmosphere starry sky light includes different functional units such as a constellation unit, a planetary unit, a starry sky unit and a background unit to achieve different atmosphere effects. The constellation unit is configured to switch patterns of twelve constellations and perform projection display on the patterns of the twelve constellations. The starry sky unit is configured to project a starry sky background. The background unit is configured to project patterns of aurora, clouds, and ripples. The planetary unit is configured to switch patterns of a planet, and to project and display a planetary image. The constellation unit, the planetary unit, the starry sky unit and the background unit form a panoramic image of the cosmic starry sky by superimposing and combining.

Figure 1:
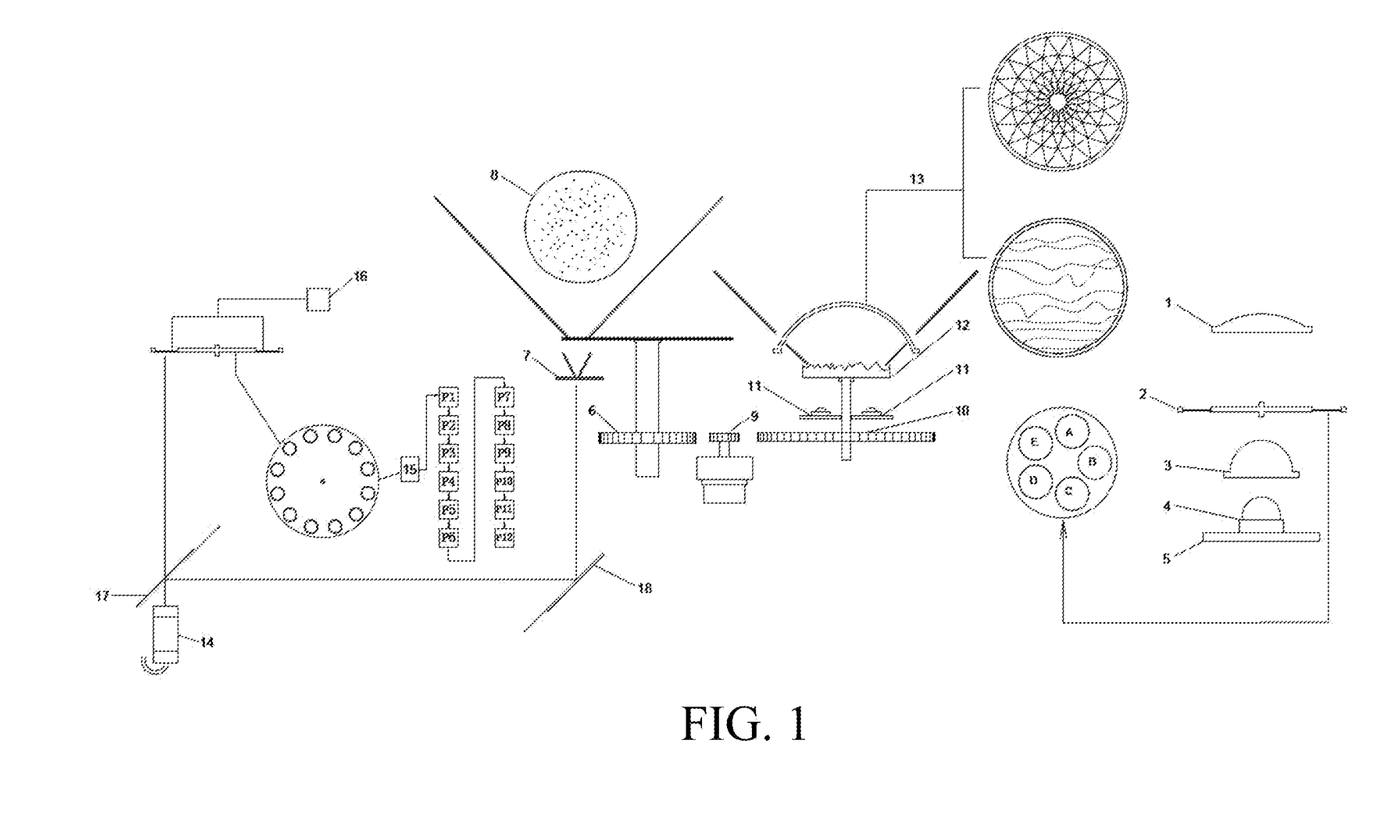
FIG. 1 is an overall structure diagram of the atmosphere starry sky light of the present disclosure.
Figure 2:
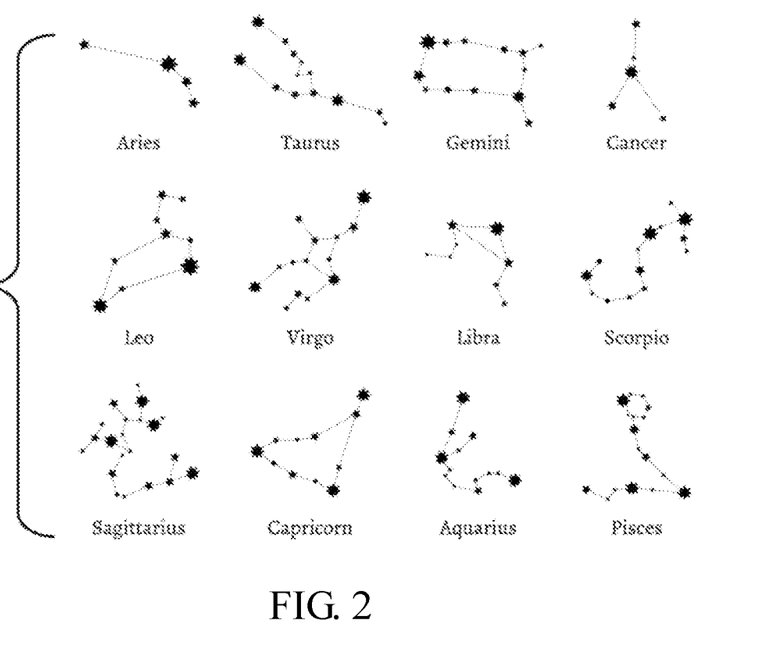
FIG. 2 is a schematic diagram showing the twelve constellations of the DOE grating combination disk.
Figure 3:
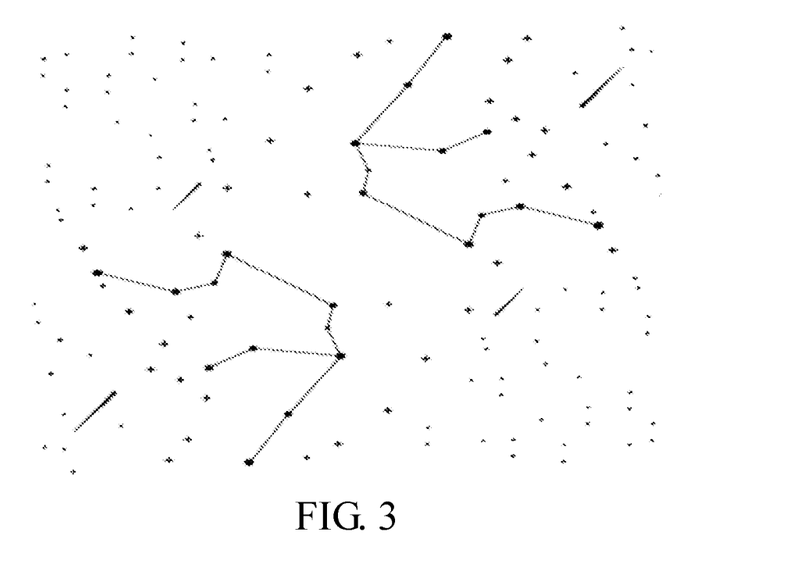
FIG. 3 is the constellation pattern P1 formed by superposition and combination.
Figure 4:
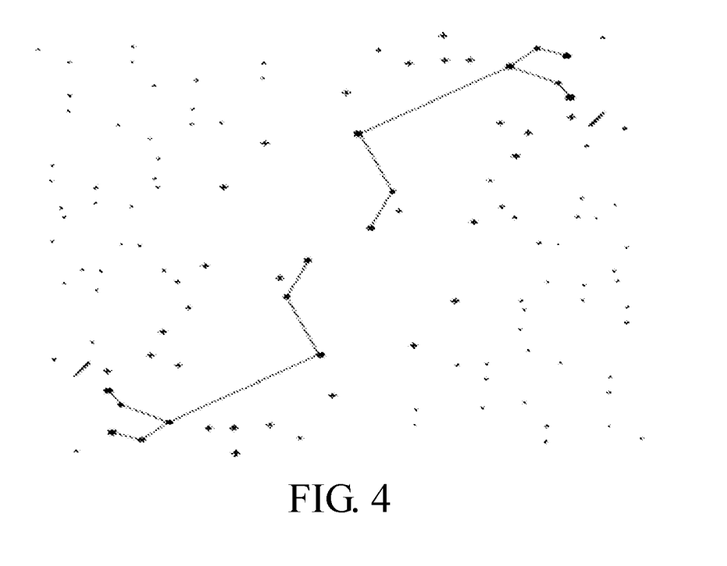
FIG. 4 is the constellation pattern P2 formed by superposition and combination.
Figure 5:
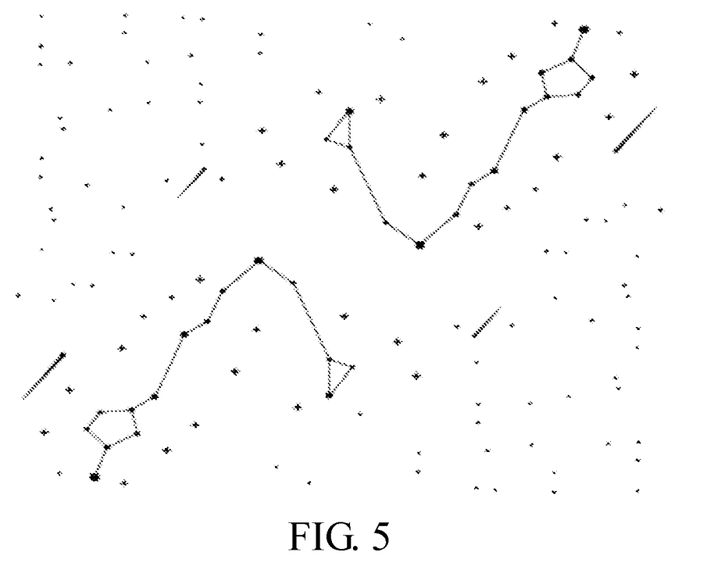
FIG. 5 is the constellation pattern P3 formed by superposition and combination.
Figure 6:
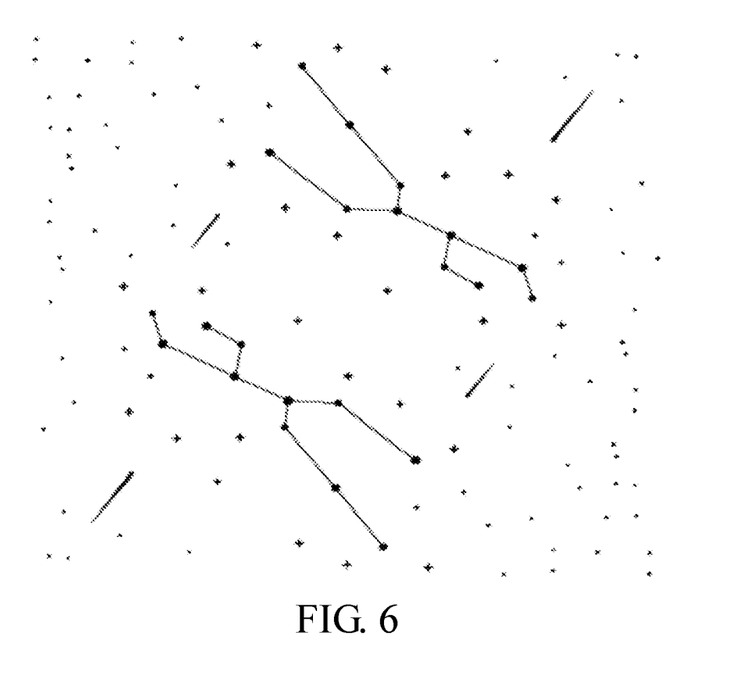
FIG. 6 is the constellation pattern P4 formed by superposition and combination.
Figure 7:
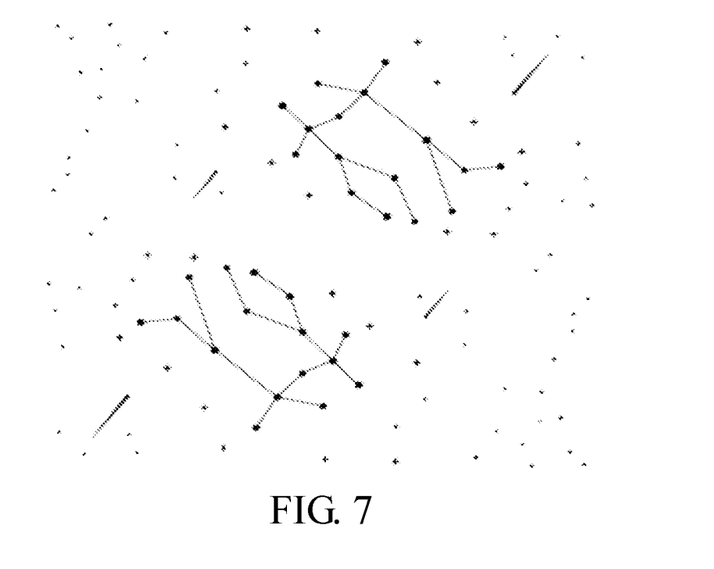
FIG. 7 is the constellation pattern P5 formed by superposition and combination.
Figure 8:
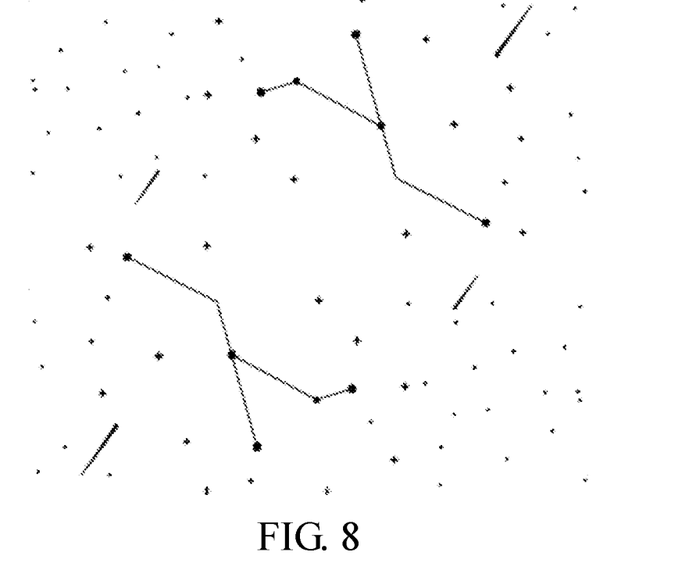
FIG. 8 is the constellation pattern P6 formed by superposition and combination.
Figure 9:
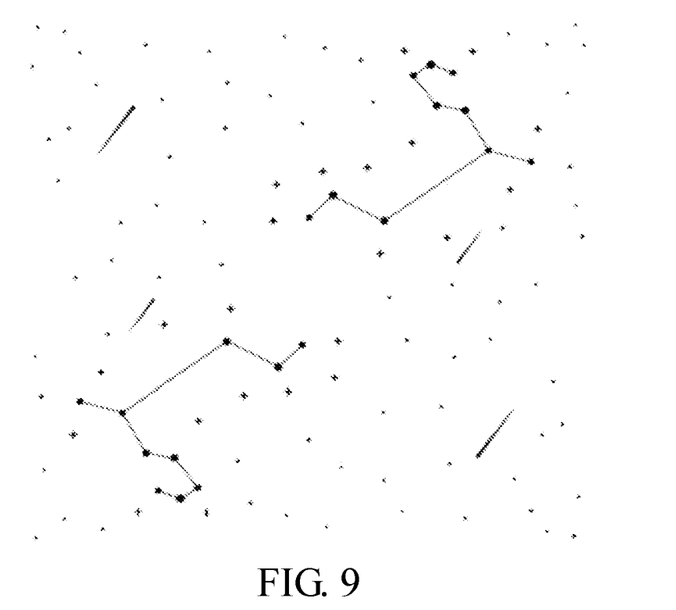
FIG. 9 is the constellation pattern P7 formed by superposition and combination.
Figure 10:
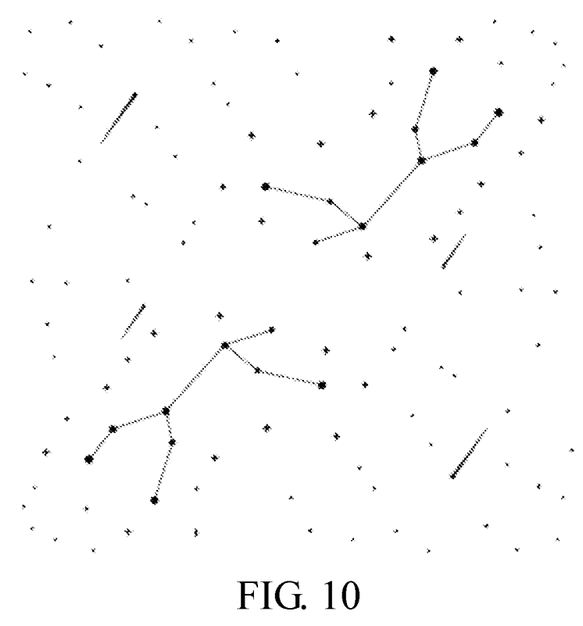
FIG. 10 is the constellation pattern P8 formed by superposition and combination.
Figure 11:
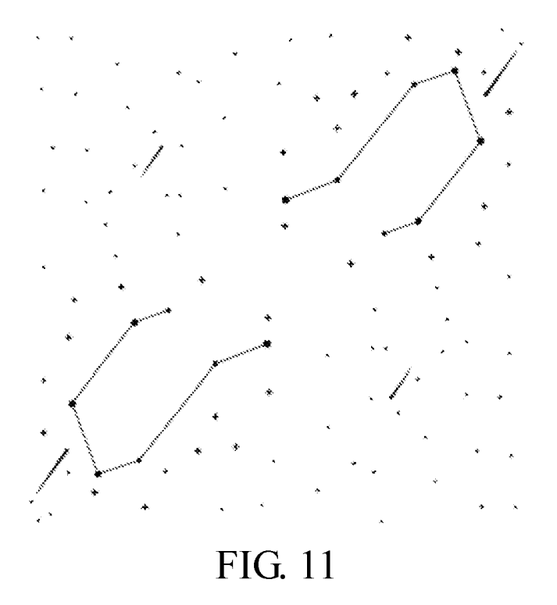
FIG. 11 is the constellation pattern P9 formed by superposition and combination.
Figure 12:
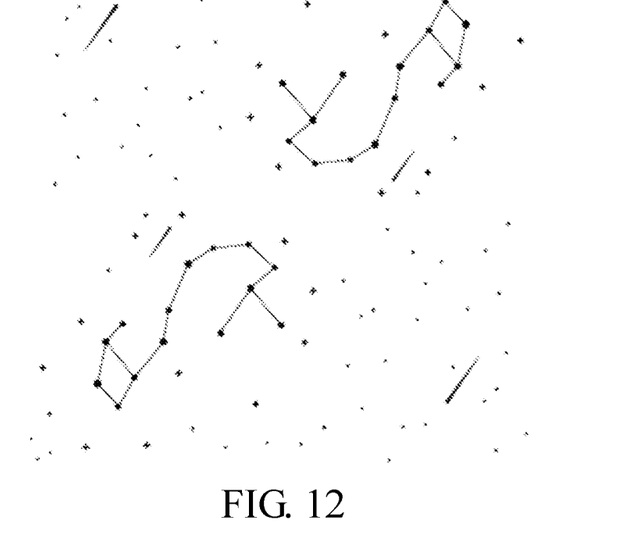
FIG. 12 is the constellation pattern P10 formed by superposition and combination.
Figure 13:
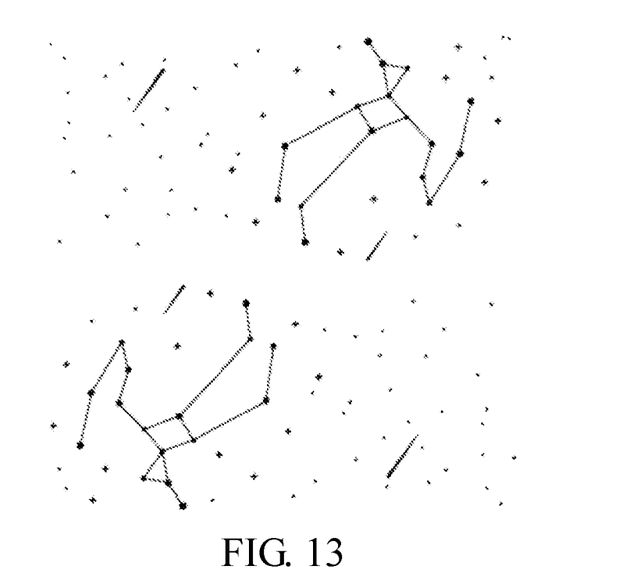
FIG. 13 is the constellation pattern P11 formed by superposition and combination.
Figure 14:
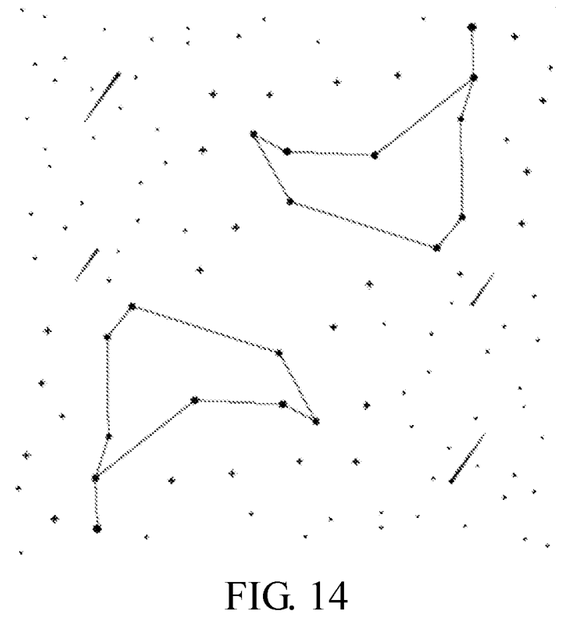
FIG. 14 is the constellation pattern P12 formed by superposition and combination.

As shown in FIG. 1, the constellation unit is provided with a DOE grating combination disk 15, the DOE grating combination disk 15 is provided with a twelve constellation pattern, the twelve constellation pattern is arranged in a circle on the DOE grating combination disk 15, a constellation pattern DOE grating lens 16 is arranged above the DOE grating combination disk 15, a laser generator 14 is provided below the DOE grating combination disk 15, an optical path of the laser generator 14 emitting laser light is divided into two paths by a beam splitter 17, in which one optical path passes through the DOE grating combination disk 15 and forms the twelve constellation pattern on the constellation pattern DOE grating lens. The DOE grating combination disk 15 can image constellation patterns, including a constellation pattern P1, a constellation pattern P2, a constellation pattern P3, a constellation pattern P4, a constellation pattern P5, a constellation pattern P6, a constellation pattern P7, a constellation pattern P8, a constellation pattern P9, a constellation pattern P10, a constellation pattern P11, and a constellation pattern P12.

The other optical path is directed to a stars imaging DOE grating lens 7 through a beam splitter 17 and a beam splitter 18. The stars imaging DOE grating lens 7 is arranged under a starry sky imaging DOE grating lens 8 in the starry sky unit. The stars imaging DOE grating lens 7 and the starry sky imaging DOE grating lens 8 jointly form a starry sky background and multiple moving stars.

The background unit comprises a transmission disk 10 and the transmission disk 10 is connected with the reduction motor 9. The reduction motor 9 is used to control the rotation speed of the transmission disk 10, and a planetary LED light source 11 is arranged above the transmission disk. A curved optical lens 12 and/or a serrated optical lens 13 is arranged above the planetary LED light source 11. The function of the serrated optical lens 13 and the curved optical lens 12 is to form a lighting effect similar to aurora or ripple. The lighting effect with aurora and ripple effect is combined, superimposed and switched with the starry sky, constellations and planets to enhance the visual experience of the starry sky atmosphere of the entire universe.

The planetary unit is provided with a wheel 2 with a replaceable planetary pattern, the planetary LED light source 4 is arranged under the wheel 2, and the planetary LED light source 4 is installed on a light source base 5. The wheel 2 is arranged between the planetary pattern 1 and the planetary pattern 3. The optical path emitted by the planetary LED light source 4 passes through the planetary pattern 3, the wheel 2 and the planetary pattern 1, and turning the wheel 2 can project and imagine the moon and other planets.

Figure 15:
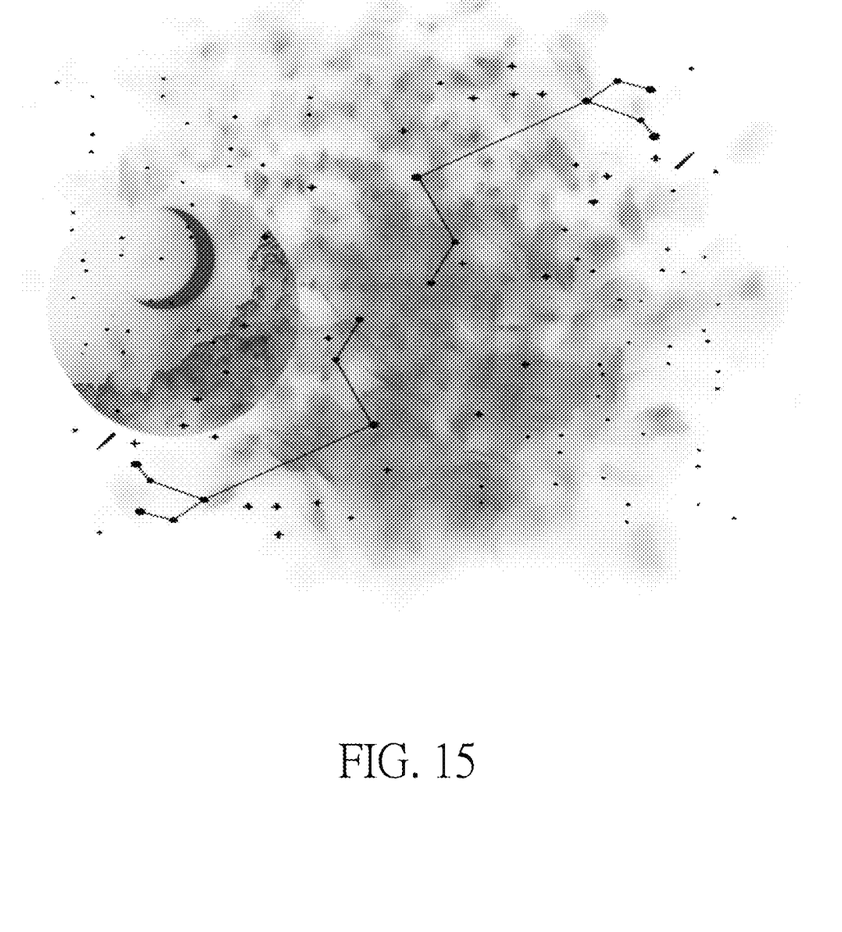
FIG. 15 is a schematic view showing a panoramic image of a starry sky according to one embodiment of the present disclosure.

In summary, the laser generator 14, the DOE grating combination disk 15, the constellation pattern DOE grating lens 16, and the beam splitter 17 form constellation patterns P1-P12, the stars imaging DOE grating lens 7, the starry sky imaging DOE grating lens 8, the laser generator 14, the beam splitter 17 and the beam splitter 18 form the starry sky pattern, and the planetary pattern 1, the wheel 2, the planetary pattern 3, the planetary LED light source 4, the light source base 5 and the planetary pattern A, the planetary pattern B, the planetary pattern C, the planetary pattern D and the planetary pattern E jointly form the planetary pattern. The constellation pattern, the starry sky pattern and the planetary pattern are superimposed, combined, and switched to form a complete astronomical starry sky panoramic image as shown in FIG. 15.

In the description of the present disclosure, it should be noted that the terms "center", "upper", "lower", "left", "right", "vertical", "horizontal", "inner", "outer", "top", "bottom", etc. indicate the orientation or positional relationship based on the orientation or positional relationship shown in the drawings, only for the convenience of describing the disclosure and simplifying the description, rather than indicating or implying the pointed device or element. It must have a specific orientation, be constructed and operated in a specific orientation, and therefore cannot be understood as a limitation of the present disclosure. In addition, unless expressly stipulated and limited otherwise, the terms "installation", "connection" and "connection" should be understood in a broad sense, for example, it can be a fixed connection, a detachable connection, or an integral connection. It can be a mechanical connection. The connection can also be an electrical connection. It can be a direct connection or an indirect connection through an intermediate medium, and it can be a connection between two components. For those of ordinary skill in the art, the specific meaning of the above-mentioned terms in the present disclosure can be understood under specific circumstances.

In this patent, unless otherwise clearly specified and limited, the terms "connected", "fixed", etc. should be interpreted broadly. For example, "fixed" can be a fixed connection, a detachable connection, or a whole. It can be a mechanical connection or an electrical connection, it can be directly connected or indirectly connected through an intermediate medium, and it can be the internal communication between two components or the interaction relationship between two components, unless specifically defined otherwise. For those of ordinary skill in the art, the specific meaning of the above-mentioned terms in the present disclosure can be understood according to specific circumstances.

In addition, the technical solutions between the various embodiments of the present disclosure can be combined with each other, but they must be based on what can be achieved by those of ordinary skill in the art. When the combination of technical solutions is contradictory or cannot be achieved, it should be considered that this combination of technical solution does not exist, nor does it fall within the scope of protection required by the present disclosure. Of course, the present disclosure can also have many other embodiments. Without departing from the spirit and essence of the present disclosure, those skilled in the art can make various corresponding changes and modifications according to the present disclosure, but these corresponding changes and deformations should belong to the protection scope of the appended claims of the present disclosure.

What is claimed is:

1. An atmosphere starry sky light for festival entertainment, comprising: a constellation unit, a planetary unit, a starry sky unit and a background unit, wherein:
the constellation unit is configured to switch patterns of twelve constellations and perform projection display on the patterns of the twelve constellations;

the starry sky unit is configured to project a starry sky background;

the background unit is configured to project patterns of aurora, clouds, and ripples;

the planetary unit is configured to switch patterns of a planet, and to project and display a planetary image; and the constellation unit, the planetary unit, the starry sky unit and the background unit form a panoramic image of a starry sky by superimposing and combining;

wherein the constellation unit is provided with a DOE grating combination disk, the DOE grating combination disk is provided with a twelve constellation pattern, a constellation pattern DOE grating lens is arranged above the DOE grating combination disk, a laser generator is provided below the DOE grating combination disk, an optical path of the laser generator emitting laser light is divided into two paths by a beam splitter, in which one optical path passes through the DOE grating combination disk and forms the twelve constellation pattern on the constellation pattern DOE grating lens, and the other optical path is directed to a stars imaging DOE grating lens under a starry sky imaging DOE grating lens in the starry sky unit.

2. The atmosphere starry sky light for festival entertainment according to claim 1, wherein a gear plate is arranged in the starry sky unit, the gear plate is connected with a reduction motor, and the stars imaging DOE grating lens is arranged between the gear plate and the starry sky imaging DOE grating lens.

3. The atmosphere starry sky light for festival entertainment according to claim 1, wherein the background unit comprises a transmission disk, the transmission disk is connected with a reduction motor, a planetary LED light source is arranged below the transmission disk, and a curved optical lens and/or a serrated optical lens is arranged above the planetary LED light source.

4. The atmosphere starry sky light for festival entertainment according to claim 1, wherein the planetary unit is provided with a wheel with a replaceable planetary pattern, a planetary LED light source is arranged under the wheel, and the planetary pattern is arranged above the wheel.

5. The atmosphere starry sky light for festival entertainment according to claim 4, wherein the planetary LED light source is installed on a light source base.

* * * * *